(12) United States Patent
Drut

(10) Patent No.: US 6,845,602 B2
(45) Date of Patent: Jan. 25, 2005

(54) SHAPING SHOULDER AND A DEVICE FOR PRODUCING LONGITUDINALLY SHAPED WEBS

(75) Inventor: Henry Drut, Dresden (DE)

(73) Assignee: GVL Gesellschaft für Verpackungs-technik und -logistik mbH, Dresden (DE)

( * ) Notice: Subject to any disclaimer, the term of this patent is extended or adjusted under 35 U.S.C. 154(b) by 0 days.

(21) Appl. No.: 10/312,621

(22) PCT Filed: Jun. 27, 2001

(86) PCT No.: PCT/DE01/02404

§ 371 (c)(1),
(2), (4) Date: Dec. 27, 2002

(87) PCT Pub. No.: WO02/00502

PCT Pub. Date: Jan. 3, 2002

(65) Prior Publication Data

US 2003/0104096 A1 Jun. 5, 2003

(30) Foreign Application Priority Data

Jun. 28, 2000 (DE) .......................................... 100 32 551

(51) Int. Cl.⁷ ................................................ B65B 9/06
(52) U.S. Cl. ............................. 53/551; 53/550; 53/552
(58) Field of Search ........................ 53/550, 551, 552; 493/248, 254

(56) References Cited

U.S. PATENT DOCUMENTS

| | | | | |
|---|---|---|---|---|
| 2,423,237 A | * | 7/1947 | Haslacher | 156/285 |
| 3,486,424 A | * | 12/1969 | Tanner | 493/468 |
| 3,785,112 A | * | 1/1974 | Leasure et al. | 53/451 |
| 3,962,958 A | * | 6/1976 | Hobart | 493/468 |
| 4,514,965 A | | 5/1985 | Adachi et al. | 53/553 |
| 4,524,965 A | | 6/1985 | Kulpa | 271/214 |
| 5,685,132 A | | 11/1997 | Romjin et al. | 53/551 |
| 5,707,329 A | * | 1/1998 | Pool et al. | 493/302 |
| 5,848,517 A | * | 12/1998 | Yamamoto et al. | 53/551 |
| 5,862,652 A | | 1/1999 | Schoeler | 53/551 |
| 6,033,114 A | * | 3/2000 | Grimm et al. | 383/106 |
| 6,599,389 B1 | * | 7/2003 | Uneda | 156/379.8 |
| 6,655,110 B2 | * | 12/2003 | Taylor | 53/373.9 |

FOREIGN PATENT DOCUMENTS

| | | |
|---|---|---|
| DE | 147 652 | 4/1981 |
| DE | 237 289 | 7/1986 |
| DE | 195 39 830 | 4/1997 |

* cited by examiner

Primary Examiner—Scott A. Smith
Assistant Examiner—Brian Nash
(74) Attorney, Agent, or Firm—Gurdun E. Huckett

(57) ABSTRACT

A shaping shoulder has a shoulder part and a prism part, joined at a shaping edge, for producing a web, shaped longitudinally in the web transport direction and having an open or closed cross-section and at least one area inside the web in which the cross-section is curved outwardly. The shoulder part has a web inlet and extends from the web inlet to the shaping edge. The prism part has an exit for the shaped web and extends from the shaping edge to the exit. The shaping edge is slanted relative to a cross-sectional prism plane. The prism cross-section is curved partially inwardly and outwardly not only in the vicinity of a web edge. The curvature of areas of the shaping edge belonging to outwardly curved areas of the prism part extend counter to the exit and the corresponding shoulder part areas are curved away from the exit.

11 Claims, 10 Drawing Sheets

SHAPING SHOULDER AND A DEVICE FOR PRODUCING LONGITUDINALLY SHAPED WEBS

BACKGROUND OF THE INVENTION

1. Field of the Invention

The invention relates to a shaping shoulder as well as a device for producing longitudinally shaped webs having an open or closed cross-section and comprising at least one area inside the web in which the cross-section is curved outwardly. These are, for example, tubular film bags with longitudinal folds, tubular film bags with one or several chambers produced by dividing in the longitudinal direction, as well as longitudinally undulate webs.

2. Discussion of the Related Art

Longitudinally shaped webs are used inter alia in the packaging technology.

Generally known, employed in the packaging technology and, for example, used in horizontally or vertically operating tubular film bag machines, are shaping shoulders for shaping a plane web of a packaging material to a longitudinally shaped web, a prism which in the longitudinal direction is closed by an overlap seam or a fin seal. These closed prisms are called tubes. The removal of the plane web from the roll past the shaping shoulder is realized by removal members. They are positioned, viewed in the direction of movement of the web, behind the shaping shoulder. For closing the longitudinal seam, welding or sealing members such as welding bars or welding belts moving together with the tube are employed. After closing the longitudinal seam, a filling pipe projecting into the tube, for example, introduces the article to be packaged into the tube. Subsequently, a transverse sealing member or transverse welding member closes the bag wherein at the same time the bottom seam of the following bag is formed.

Shaping of the plane web to a prism-shaped cross-section is carried out essentially along a spatial line on the shaping shoulder, the so-called shaping edge. The area of the shaping shoulder from the planar intake of the web in the moving direction of the web extending farther to the shaping edge is referred to as the shoulder part; the area of the shaping edge to the exit of the tube is the prism part. The web contacts partially or entirely the surface of the shoulder and is curved by it in the direction to the shaping edge. Guiding of the web in the prism part is realized by the shaping edge as well as by the web removal member acting on the exterior of the tube and the shaping pipe in the interior of the tube. The shaping pipe can be at the same time the outer envelope of a feeding pipe.

The prisms or tubes have a multitude of cross-sectional shapes. They have in common that they are always curved inwardly about the entire periphery, i.e., that their inner angle is always smaller or identical to 180 degrees. Viewed in the moving direction of the web, the shaping edge, beginning at the point of the first shaping of the web toward the web edge is curved always with increasing or continuous slant in the direction of the exit of the tube, i.e., the curvature of the shaping edge is oriented toward the end of the tube. The shoulder surface which belongs to the shaping edge is defined by a set of straight lines beginning at the shaping edge and extending to the web edge (DE 237 289, DE 195 39 830). This surface is always curved beginning at the intake of the web in the direction of the exit of the tube.

The shaping of the shaping shoulder must be planar, i.e., the surface of the shaping shoulder must be designed such that it can be developed in a plane (DD 237 289, DD 147 652). This is the prerequisite for shaping the web without forming wrinkles or producing tears.

U.S. Pat. No. 4,514,965 describes a device for producing bags with sealed edges. In the same way as for the known tube film bags with fin seal, an outward curving of the cross-section of the web is provided for the seam formation. The removal of the web at the fin seal by means of removal rollers is typical for horizontal tubular film bag machines.

Prism shapes with inner angles of greater than 180 degrees, as they are used, for example, in the case of tubes with stabilizing fold, are provided subsequently with additional shaping elements which are provided on the feeding pipe and/or the exterior side of the prism.

For example, folding members are provided below the shaping shoulder within (on the feeding pipe) or outside of the tube which shape the round tube into an angular tube and produce folds thereat (U.S. Pat. No. 5,685,132; DE 196 03 371). This shaping is not planar, i.e., a prism area cut out of this area cannot be developed in a plane. As a result, folds and tears can form in the web or expansions can occur over portions thereof which damage the web.

A further disadvantage of this method is the long shaping path because the shaping shoulder and the fold forming members are positioned sequentially viewed in the transport direction of the tube. This increases the machine size and the product drop height and thus causes damage of the products during the filling process.

A disadvantage of most tubular film bag machines is the technically complex tube removal. The removal force can engage only on the exterior side of the tube, for example, by means of an intermittently moving suction ring or suction belt. For example, friction belts are also employed. In this connection, the different frictional coefficient between a rubberized removal belt and the exterior side of the tube, on the one hand, as well as of a polished shaping pipe and the inner side of the tube, on the other hand, is utilized.

Also known, in general, are machines for shaping a double tube. By means of the shaping shoulder the outer edges of the web are folded such that they meet again at the web center and are then welded to one another or against the web center. In this way, two planar tubes are produced into which flat articles to be packaged, for example, tea bags, can be inserted automatically. However, it is not possible to package articles with great product height in this way. The widening of the tube pair would constitute a non-planar shaping and would result in the above mentioned disadvantages of wrinkle formation or tear formation.

Moreover, generally known is a method of production of several flat bags which move parallel to one another through the machine. In this connection, two webs which move in opposite directions toward one another are welded or sealed with one another in the longitudinal direction upon meeting one another so that a chain of parallel extending tubes arranged transversely to the transport direction or a bag with several chambers separated from one another in the transport direction are formed. The shaping is realized by guiding the web onto flat feeding pipes projecting between the longitudinal welding devices. Shaping is realized in this way in a non-planar fashion. Shaping is possible with avoidance of folds and wrinkles only when the tubes are not opened far. The tubes remain very flat so that they cannot be filled optimally.

SUMMARY OF THE INVENTION

The object of the invention resides in providing a shaping shoulder as well as a device for producing a web shaped in the longitudinal transport direction with open or closed cross-section and with at least one area inside the web in which the cross-section is curved outwardly, for the manufacture of, for example, a tube with one or several folds or undulations, a tube chain with several chambers separated from one another in the longitudinal direction or an undulate web.

According to the invention this object is solved by a shaping shoulder wherein the cross-section of the prism part is curved not only in the vicinity of the web edge partially inwardly and outwardly, wherein the curvature of those areas of the shaping edge which belong to outwardly curved areas of the prism part extends counter to the exit of the shaped web and the corresponding shoulder areas are curved away from the exit of the shaped web, and by a device having underneath the shaping shoulder removal members are arranged which grip the tube formed by the prism part at overlapping areas.

The shaping shoulder according to the invention is comprised of one or several shoulder parts and a prism part which adjoin along a spatial shaping edge, with areas of the prism part, which are curved inwardly, wherein the shaping edge sections belonging to these parts, when viewed from the web center toward the edge of the web, tend to curve increasingly in the moving direction of the web and the corresponding areas of the shoulder part are curved toward the exit of the tube.

For producing a tube, inwardly curved areas of the prism part alternate with outwardly curved ones, wherein the outward curvature always serves for cross-section widening and, subsequently thereto, an inward curvature for closing the cross-section is provided, wherein the shaping edge and the corresponding shoulder parts follow this pattern in the described way. Those areas of the shaping edge which belong to outwardly curved areas of the prism part and are not in the vicinity of the web edge but inside the web, tend according to the invention to curve counter to the moving direction of the web; the corresponding shoulder areas are curved away from the exit of the web.

For producing an undulate web, the inwardly curved areas of the prism part alternate with outwardly curved ones. Those areas of the shaping edge which belong to the outwardly curved areas of the prism part and are not in the vicinity of the web edge but are positioned inside the web tend according to the invention to curve counter to the moving direction of the web; the corresponding shoulder areas are curved away from the exit of the shaped web.

The web support in the shoulder area can be designed such that individual shoulder parts are provided on both sides of the web. They support the web in the direction of curvature that is predominant in this section. These shoulder parts are designed to be friction-reducing. They can be, for example, embodied as a roller.

Surprisingly, it was found that shaping processes which have been very complex in the past can be realized by means of the shaping shoulder according to the invention. In this way, the manufacture of the bags with folds but also of tubular film bags which are divided several times in the longitudinal direction is possible.

In tubular film bag machines for producing tube cross-sections with stabilizing folds a significant reduction of the total shaping height in comparison to the prior art is possible. In this way, the product drop height and machine size are reduced. Additional shaping elements for forming the folds are no longer needed.

With the shaping shoulders according to the invention overlapping tube areas, for example, folds or several seam areas, are produced. The tube removal can be realized by engagement of the removal force on these overlapping areas. This is possible very simply by intermittently moving clamping grippers or by one or several roller pairs. In this way, the technical expenditure for the configuration of the tube removal is significantly reduced.

In an advantageous configuration of the invention, the removal members can be controlled with different speed (roller pairs) or with different removal stroke (grippers).

BRIEF DESCRIPTION OF THE DRAWINGS

By means of the attached drawings, embodiments of the invention will be explained in more detail. It is shown in.

DESCRIPTION OF THE PREFERRED EMBODIMENTS

Figure 1:
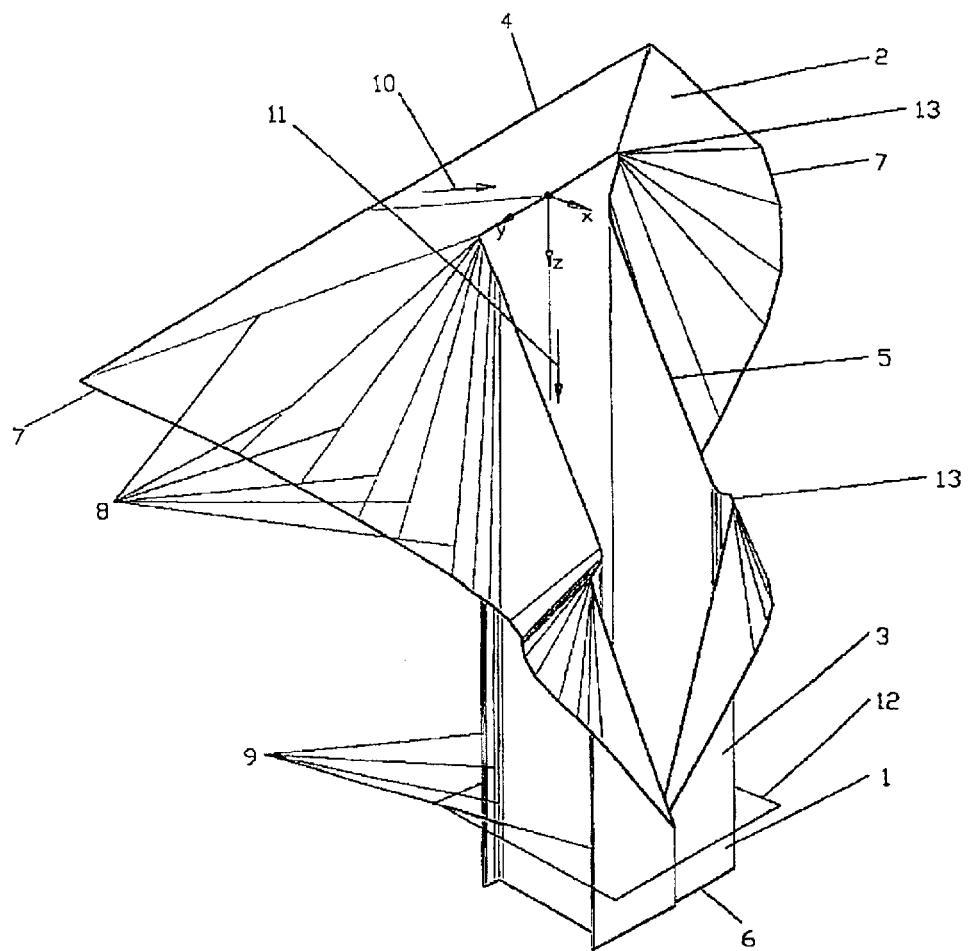
FIG. 1: shaping shoulder for shaping a tube with four stabilizing folds in a perspective view.
Figure 2:
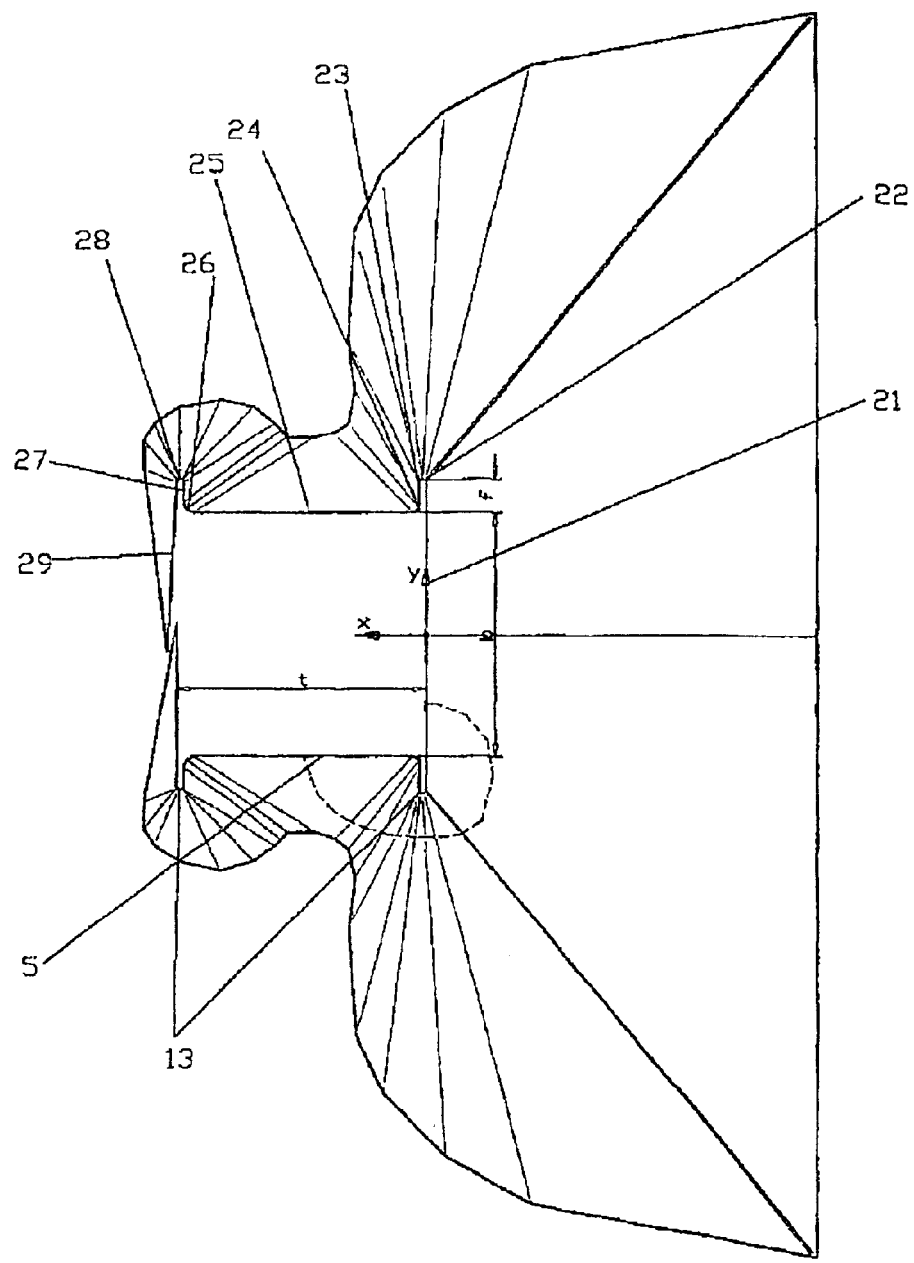
FIG. 2: shaping shoulder for shaping a tube with four stabilizing folds in a plan view.
Figure 3:
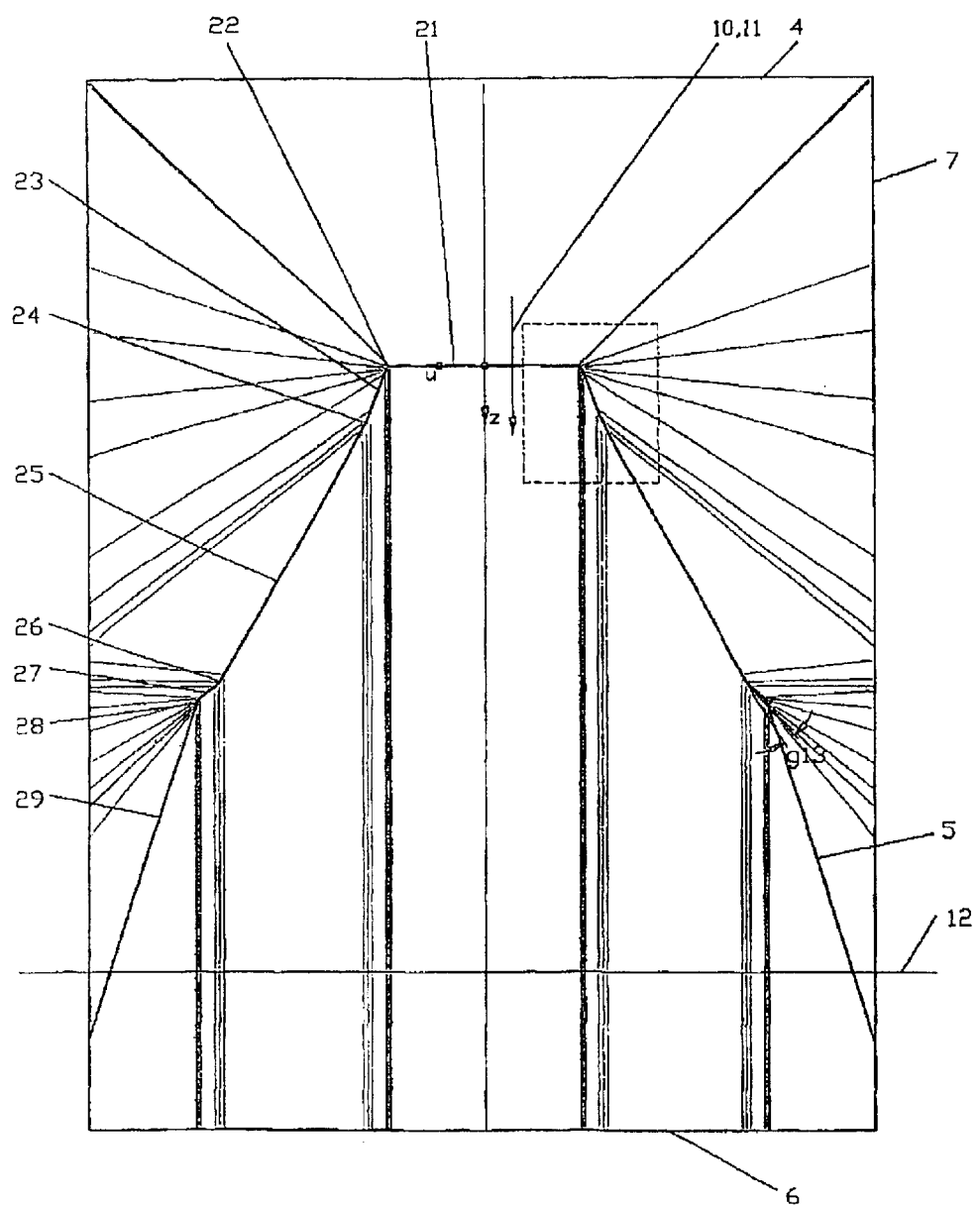
FIG. 3: shaping shoulder for shaping a tube with four stabilizing folds developed in a plane.

FIGS. 1 to 4 show a shaping shoulder for shaping a tube with four stabilizing folds in a perspective view (FIG. 1), in a plan view (FIG. 2), in a form developed in a plane (FIG. 3), as well as detail views of FIG. 2 and FIG. 3. The x-y-z coordinate system and the peripheral coordinate u facilitate orientation on the shaping shoulder.

The shaping shoulder (1) is comprised of a shoulder part (2) and a prism part (3). They are connected along the shaping edge (5). Viewed in the intake direction (10) of the web, the web moves from the web intake (4) on the shoulder part (2) via the shoulder part (2) to the shaping edge (5) and from there in the web transport direction (11) along the prism part (3) to the exit (6) of the tube. The web edge (7) extends along the outer boundary of the shoulder part (2).

The surface of the shoulder part (2) contacting the web is defined by straight lines, the shoulder edges (8), which extend from the shaping edge (5) to the web edge (7). The spacing between two shoulder edges (8) is incrementally small. In FIGS. 1 through 9, some shoulder edges (8) are shown in an exemplary fashion.

The prism surface of the tube is defined by straight lines, the prism edges (9), which extend from the shaping edge (5) parallel to the tube transport direction. The spacing between two prism edges (9) is incrementally small. In FIGS. 1 through 9 some prism edges (9) are shown in an exemplary fashion.

The angle by which the web is curved on the prism edges (9) is defined as inner prism angle d. The inner prism angles d are numbered with ascending numbers in FIG. 4 in correlation with the prism edges (9) beginning in the web center in a direction toward the web edge (7).

At the location on the shaping edge (5) where one shoulder edge (8) and one prism edge (9) adjoin, respectively, the shaping edge (5) is curved. The angle by which the shaping edge (5) is curved at this location is defined as shaping edge angle of curvature g. The shaping edge angles of curvature g are numbered with ascending numbers in FIGS. 3 and 4 in correlation with the prism edges (9) beginning at the web center in the direction toward the edge of the web (7).

When the shaping edge (5) is curved more strongly toward the exit of the tube (6) or in the transport direction (11) of the tube, the shaping edge angle of curvature g is defined as positive. When the shaping edge (5) is curved away from the exit (6) of the tube, i.e., counter to the transport direction (11) of the tube, the shaping edge angle of curvature g is defined as negative.

The planes (12) of the prism cross-section (12) are those planes on the prism part (3) which extend parallel to the base surface of the prism part (3).

In FIG. 2, the cross-section of the rectangular tube to be formed with four stabilizing folds and the plan view of the shaping edges (5) are shown. The peripheral line (coordinate u-FIG. 3) follows the projection of the shaping edge (5) in the x-y plane, beginning at the web center and extending to the web edge (7).

Figure 4:
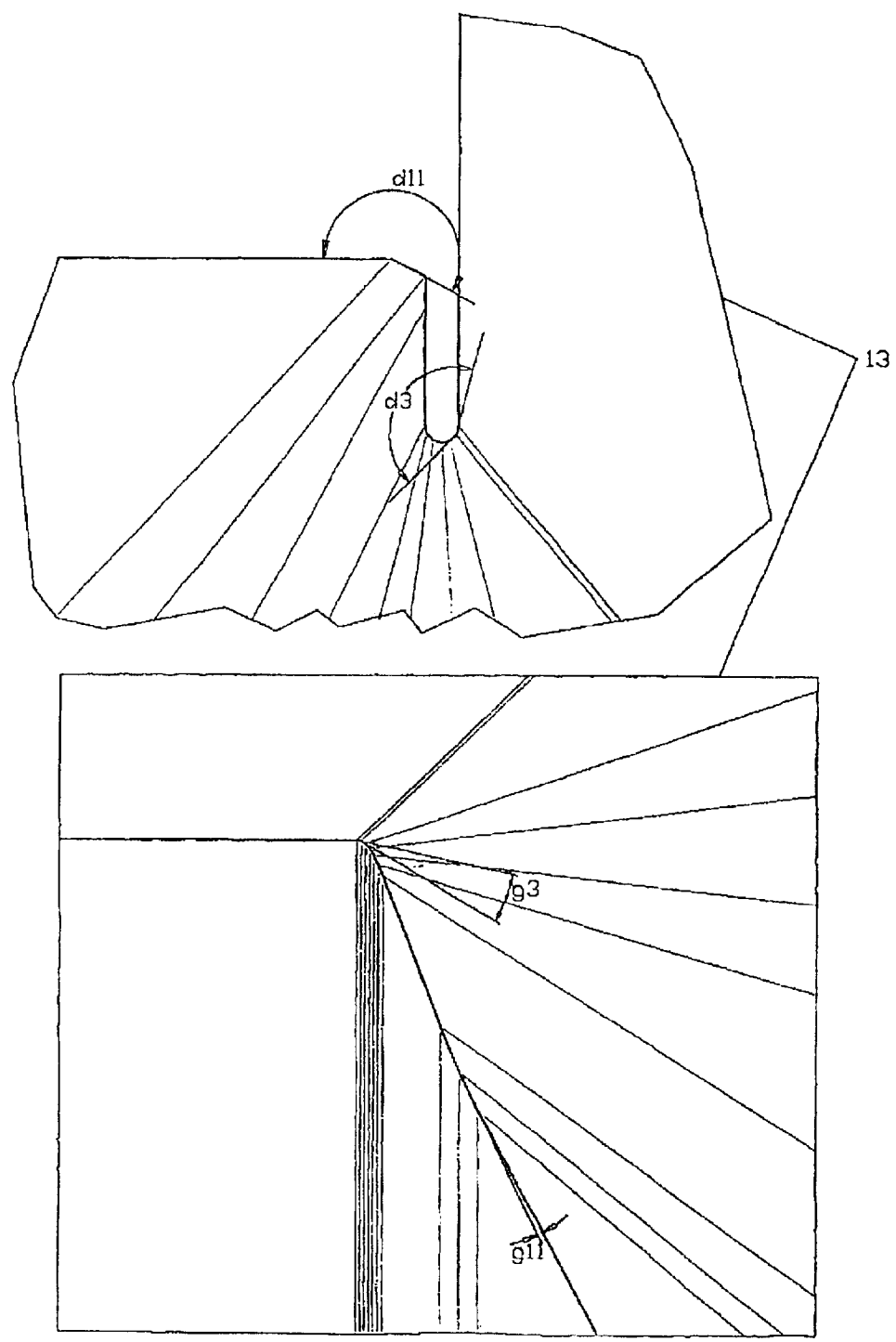
FIG. 4: details of FIG. 2 and FIG. 3.

For describing the shaping shoulder for shaping a tube with four stabilizing folds, the shaping edge (5) according to FIGS. 2 and 3 is divided into several sections (21–29) which comprise several prism edges (9) counted from the shaping edge section 21 and not identified in detail in FIGS. 2–4). This results in the following correlations:

shaping edge section 21 is positioned between prism edges 1 and 2 shaping edge section 22 is positioned between prism edges 2 and 8 shaping edge section 23 is positioned between prism edges 8 and 9 shaping edge section 24 is positioned between prism ages 9 and 11 shaping edge section 25 is positioned between prism edges 11 and 12 shaping edge section 26 is positioned between prism edges 12 and 14 shaping edge section 27 is positioned between prism edges 14 and 15 shaping edge section 28 is positioned between prism edges 15 and 21 shaping edge section 29 is positioned between prism edge 21 and web edge (7).

The dimension b defines the width and the dimension t defines the depth of the tube cross-section to be formed. The width of the fold to be formed on the corners of the tube is identified at f.

Starting at the web center, the shaping edge (5) or the circumferential line in the section (21) first extends in the direction y about half the width of the tube b/2 with the added fold width f. In the section (22) it is bent in a curve by 180 degrees to the center of the tube. In the section (23) it extends farther in the direction to the web center. In the section (24) upon reaching half the width b/2 of the tube, the circumferential line is bent by 90 degrees. In the section (25) it extends again in the direction x with increasing depth t of the tube. In the section (26) the circumferential line is bent by an additional 90 degrees. In the section (27) it extends farther outwardly by the fold width f. In the section (28) the circumferential edge (5) is again bent by 180 degrees toward the center of the web. In the section (29) the circumferential edge (5) extends farther in this direction toward the seam forming area or the web edge (7). In the illustration of the shaping shoulder according to FIG. 1 to FIG. 4, the seam is at the center of the tube.

The sections 21, 22, 23, and 24 as well as the sections 26, 27, 28, and 29 form a stabilizing fold area (13), respectively.

The design of the shaping edge (5) of this shaping shoulder (1) as a function of the inner prism angle d is illustrated in FIGS. 3 and 4. FIG. 4 shows in the upper illustration a detail of FIG. 2 and in the lower illustration a detail of FIG. 3 of the stabilizing fold area (shown in FIGS. 2 and 3 in dashed lines) which is formed by the sections 21 to 24.

The inner prism angle d3 on the prism edge number 3 is smaller than 180 degrees, the shaping edge curvature extends towards the exit (6) of the tube. The shaping edge angle of curvature g3 according to the prior art has a positive orientation. In contrast, the prism angle d11 on the prism edge number 11 is greater than 180 degrees, the shaping edge curvature according to the invention extends counter to the direction of the exit (6) of the tube. The shaping edge angle of curvature g11 according to the invention has been selected to be negative.

The negative shaping edge angle of curvature can be seen particularly clearly at the prism edge number 13, at g13 (FIG. 3).

The shoulder surface is designed such that the shoulder in areas in which the shaping angle of curvature g is positive is curved in the direction of the exit of the tube. According to the invention, in the areas in which the shaping edge angle of curvature g is negative, it is curved away from the exit of the tube (FIG. 2).

Figure 5:
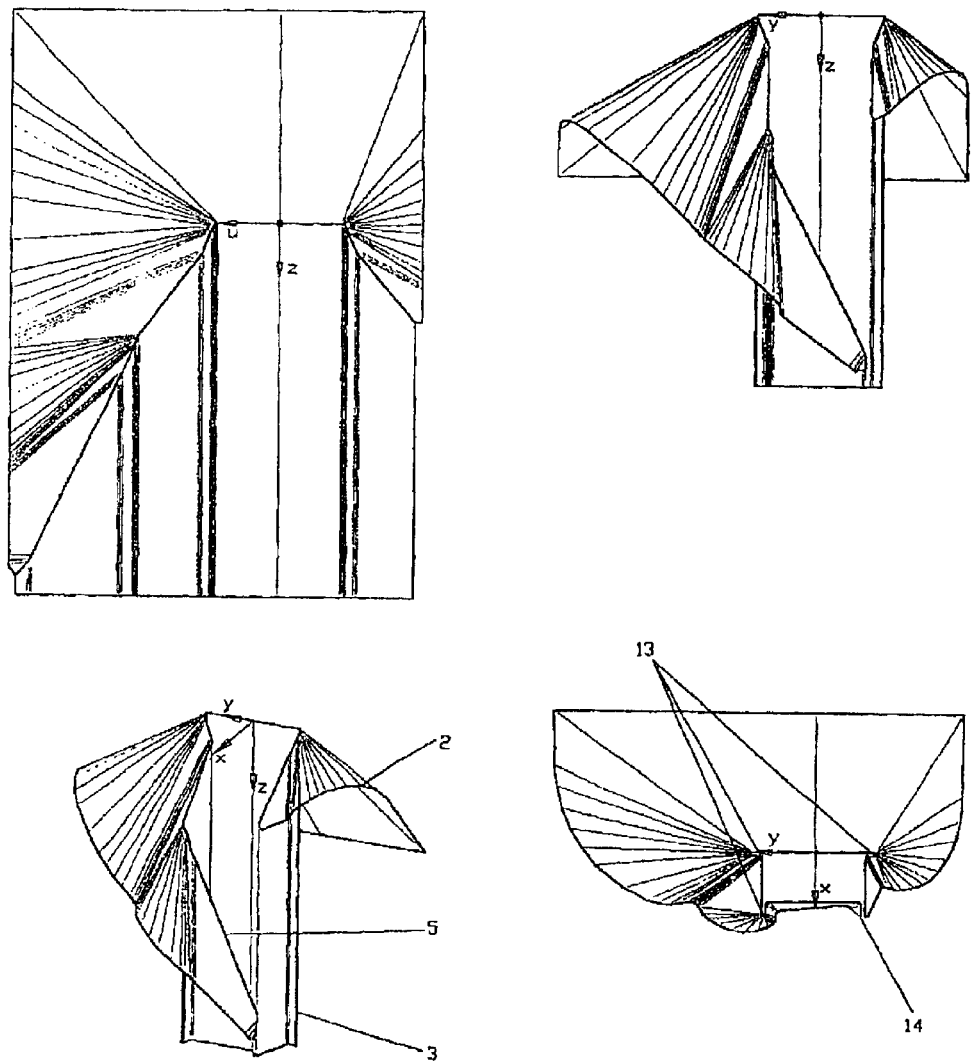
FIG. 5: shaping shoulder for shaping a tube with three stabilizing folds and a fourth stabilizing folds serving as a longitudinal seam in three views and in the developed state.

FIG. 5 shows another variant according to the invention of a shaping shoulder for producing a tube with stabilizing folds in four different views. The cross-section of the prism part (3) has three stabilizing fold areas (13). The longitudinal seam (14) forms a fourth stabilizing fold. The configuration of the prism part (3), shaping edge (5), and shoulder part (2) in the stabilizing fold area (13) is realized in analogy to the shaping shoulder in FIGS. 1 through 4. For forming the longitudinal seam (14) an outward curvature of the cross-section is provided also. This curvature is however in the vicinity of the web edge and corresponds to the prior art. This longitudinal seam shape is referred to as a fin seal.

Figure 6:
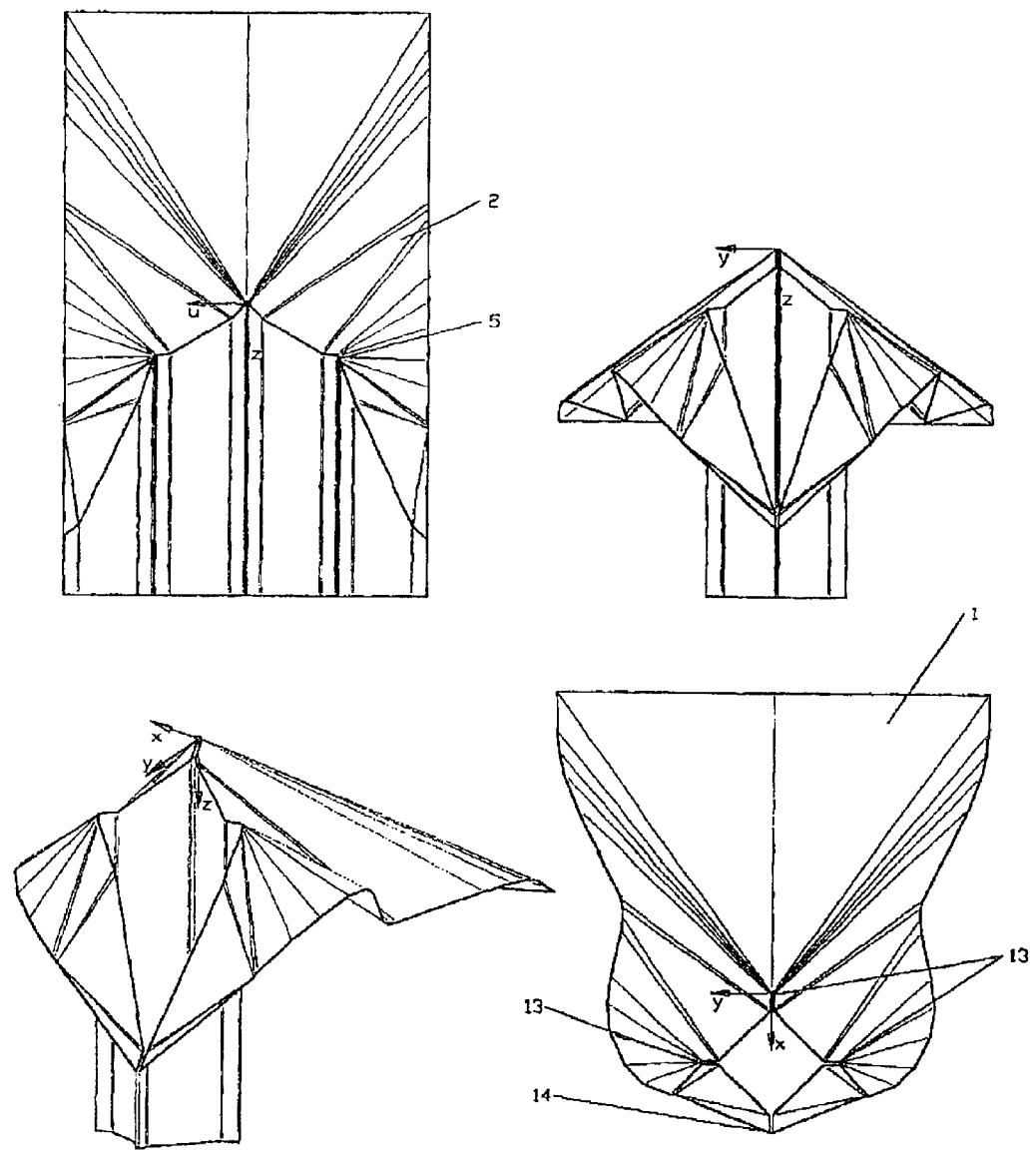
FIG. 6: shaping shoulder for shaping a tube with four stabilizing folds with a tube cross-section rotated by 45 degrees in three views and in the developed state.

A further variant of a shaping shoulder (1) according to the invention for producing a tube with stabilizing folds in four different views is illustrated in FIG. 6. Three stabilizing fold areas (13) are arranged relative to the longitudinal seam (14), which also functions as a stabilizing fold, such that a symmetrical shaping shoulder results. The shaping edge (5) and the shoulder part (2) in the stabilizing fold area (13) are configured in analogy to the shaping shoulder of FIGS. 1 through 4. In regard to the longitudinal seam (14) the above said holds true.

Figure 7:
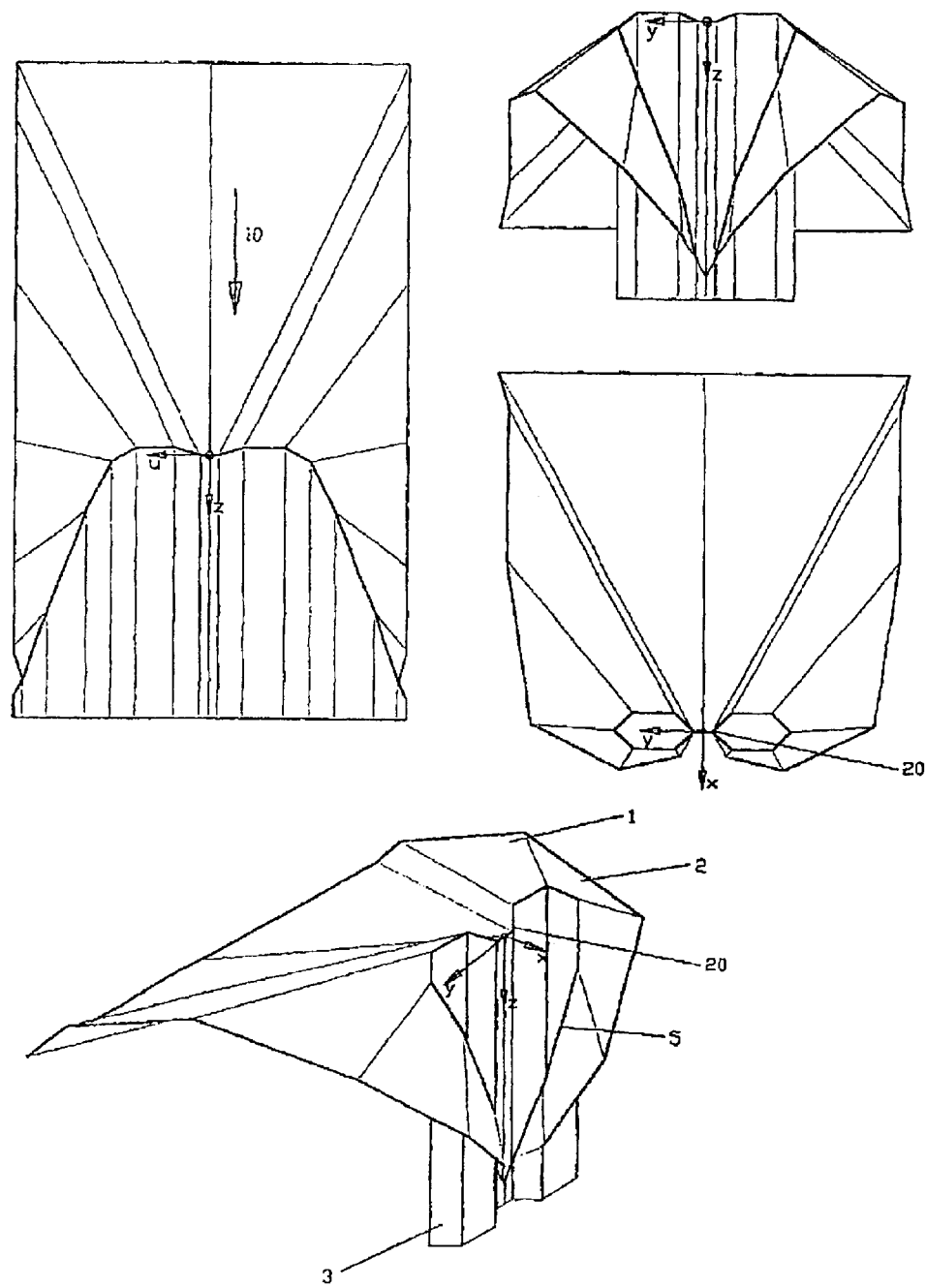
FIG. 7: shaping shoulder for shaping a double tube in three views and in the developed state.

FIG. 7 shows a shaping shoulder (1) for producing a double tube of a single film web in four different views. In the area of the prism part (3) correlated with the center of the web, its cross-section extends transversely to the moving direction (10) of the web and, in the area (20) adjoining it on both sides, is outwardly curved in accordance with the invention. The curvature of the areas of the shaping edge (5) and the shoulder part (2) corresponding to this area (20) is realized in analogy to the inventively described way. In this way, a wide opening of the tube produced on both sides is effected. The areas of the prism part (3) adjoining in the direction of the web edge are curved inwardly as is known in the art and close the cross-section of the two tubes. The web edges are joined (sealed or welded) with the web areas inside the web, i.e., in this case with the web center. For this purpose, the web in the vicinity of the web edge is outwardly curved corresponding to the prior art.

The special advantage of this solution is the simultaneous production of two tubes with a wide opening so that this solution can be employed for many packaging tasks. In tubular film bag machines the output can be doubled with identical working speed and thus identical product load.

Figure 8:
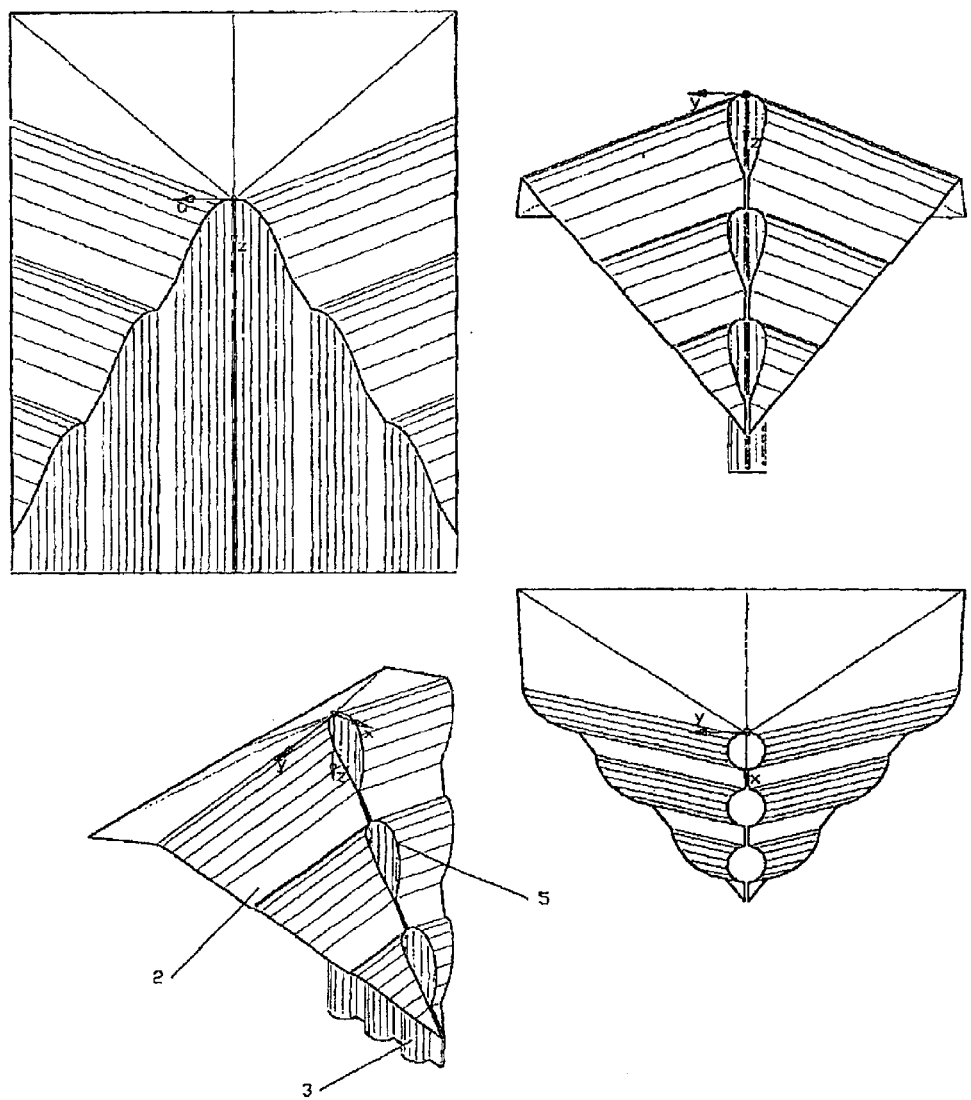
FIG. 8: shaping shoulder for shaping a parallel tube chain in three views and in the developed state.

FIG. 8 shows a shaping shoulder for shaping a parallel bag chain in four different views. The prism part (3), beginning at the web center, is curved inwardly with sections thereof and, after closing a cross-section and forming the seam, is curved outwardly again according to the invention. In this way, the cross-section of a parallel bag chain or tube cross-section with several chambers in the longitudinal direction results. Shaping edge (5) and shoulder part (2) are shaped according to the invention in the outwardly curved areas of the prism part (3).

This solution can be used advantageously for producing tubes with small cross-sections, for example, for serving-size packaging, in which according to the prior art the use of several adjacent and parallel shaping shoulders conventional with each shoulder forming a tube. The advantage resides in the reduced machine-technological expenditure for handling the webs.

Figure 9:
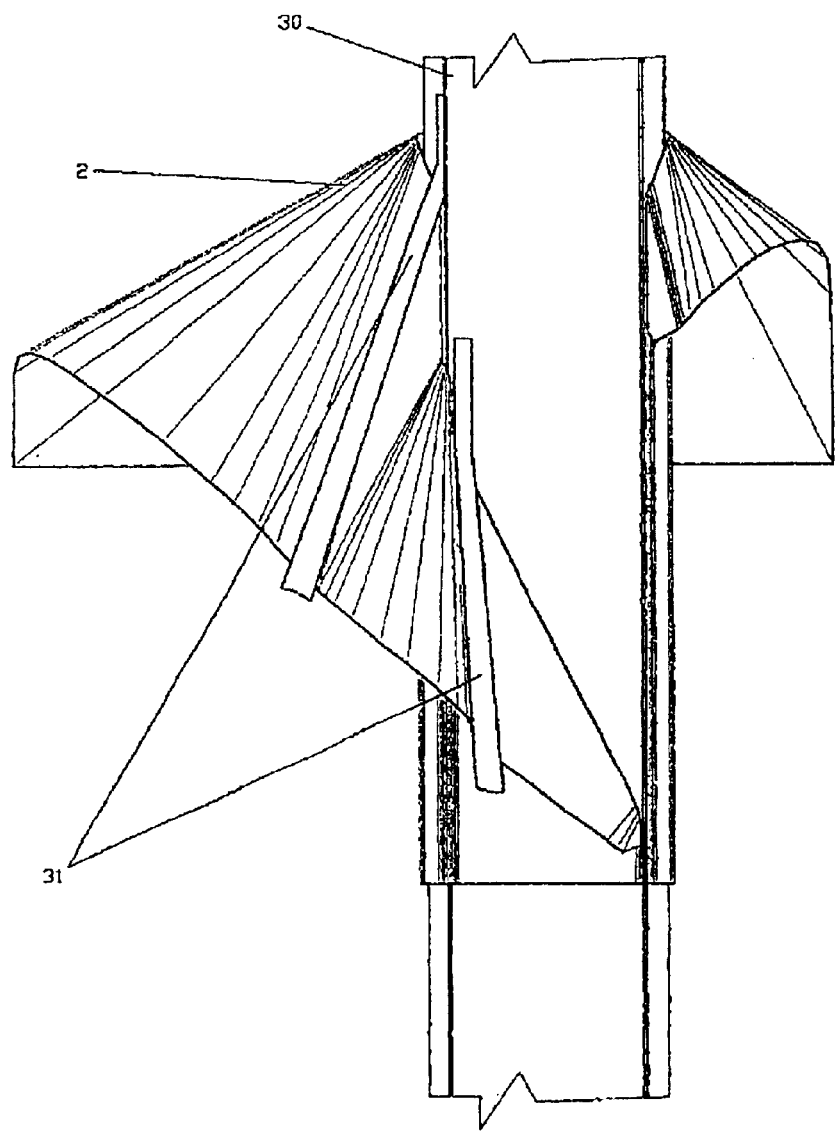
FIG. 9: shaping shoulder of FIG. 5 with several shoulder parts.

FIG. 9 shows the asymmetric shaping shoulder with stabilizing folds according to FIG. 5. For providing additional support of the tube, a shaping pipe (30) is illustrated in the interior. In this embodiment, according to one embodiment of the invention, two additional shoulder parts (31) are provided for supporting the web. They are located above the web and support those areas of the web which are curved counter to the exit of the tube. The additional shoulder parts (31) are fastened in this embodiment on the shaping pipe (30).

Figure 10:
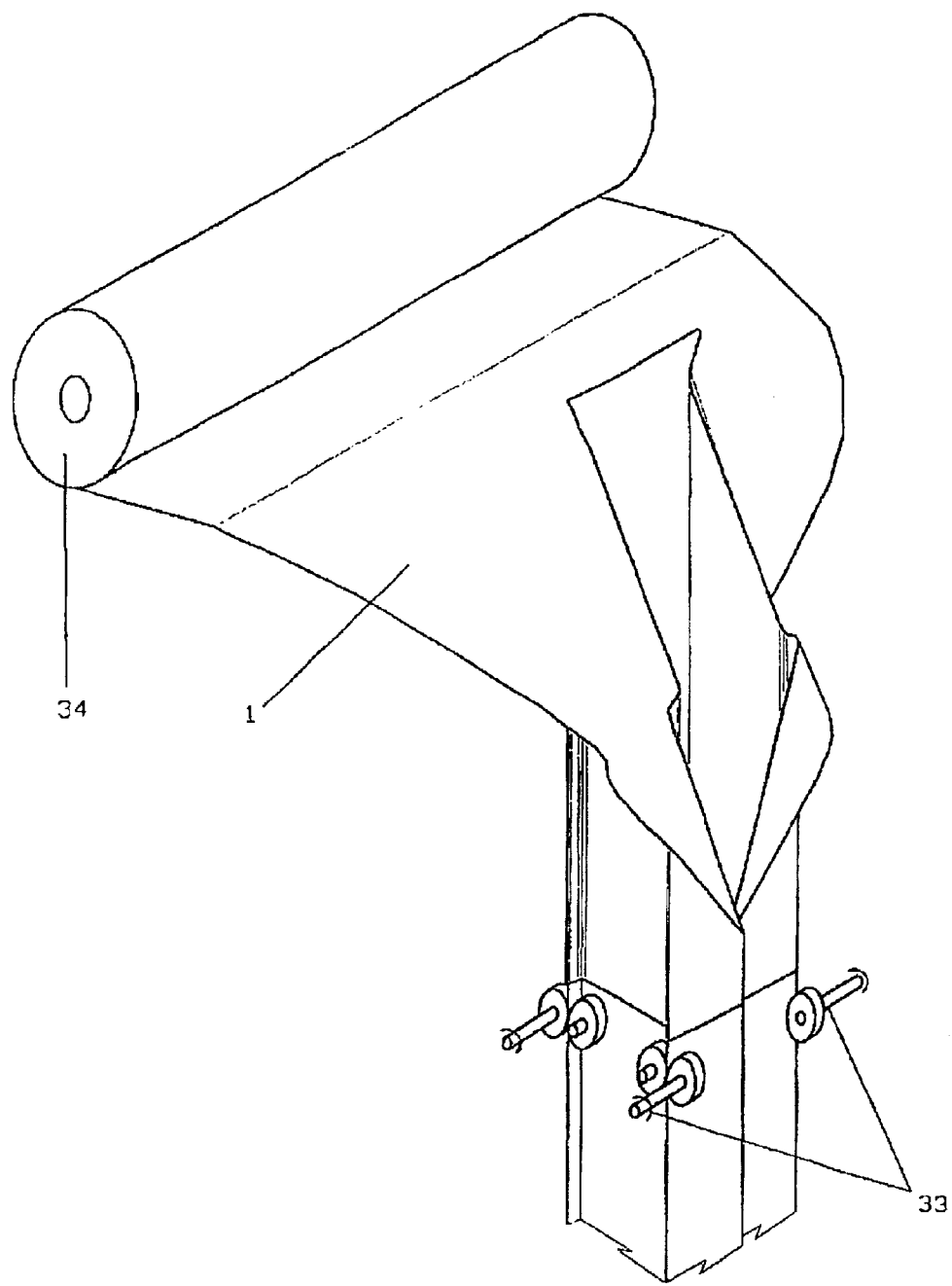
FIG. 10: shaping shoulder of FIG. 1 to FIG. 4 with a tube removal device.

FIG. 10 shows a shaping shoulder according to FIGS. 1 through 4. The web extends from the web roll (34) into the shaping shoulder (1) and is shaped here into a tube with stabilizing folds. Corresponding to one embodiment of the invention, the web removal members are arranged underneath the shaping edge which clamp the web in overlapping areas of the tube cross-section (stabilizing fold, longitudinal seams). The web removal members can be embodied as clamping grippers. The web removal in this case is carried out intermittently as a result of a common downward movement of the clamping grippers. In the embodiment according to FIG. 10, roller pairs (33) are arranged in the area of the overlaps which press against one another from one side of the overlapping areas of the web, respectively, wherein one roller is driven, respectively. The web removal is carried out continuously in this case. The advantage of this configuration of the invention resides in the technically simplified manipulation of the web in comparison to tubular film bag machines according to the prior art. The roller pairs can be driven at different speed. Corresponding to a further embodiment of the invention, the removal members can be formed at the same time as welding members.

Of course, it is also possible to arrange the above described removal members on the overlapping areas of the double tube according to FIG. 7 or of the tube chains according to FIG. 8.

LIST OF REFERENCE NUMERALS 1 shaping shoulder
2 shoulder part
3 prism part
4 intake of web
5 shaping edge
6 exit of web
7 web edge
8 shoulder edge
9 prism edge
10 intake direction of web
11 transport direction of web
12 plane of prism cross-section
13 stabilizing fold area
14 longitudinal seam
20 area
21–29 sequential sections of the shaping edge
30 shaping pipe
31 additional shoulder part
33 roller pair
34 web roll
b width of the tube cross-section to be formed
d inner prism angle
f width of the fold to be formed
g shaping edge angle of curvature
t depth of the tube cross-section to be formed
u peripheral coordinate
x,y,z coordinates

What is claimed is:

1. A shaping shoulder for producing a web shaped longitudinally relative to a transport direction of the web and having an open or closed cross-section and at least one area inside the web in which the cross-section is curved outwardly, the shaping shoulder comprising:

a shoulder part and a prism part joined to one another at a shaping edge;

wherein the shoulder part has a web inlet and extends from the web inlet to the shaping edge and wherein the prism part has an exit, where the web exits after shaping as a shaped web, and extends from the shaping edge to the exit;

wherein the prism part has a longitudinal extension in the transport direction of the web along the prism part toward the exit and has a cross-section perpendicular to the longitudinal extension;

wherein the shaping edge is slanted in a direction toward the exit relative to a plane of the cross-section of the prism part;

wherein the cross-section of the prism part has inwardly curved areas and outwardly curved areas located at least in the vicinity of a web edge, wherein the shaping edge is slanted less relative to the plane of the cross-section of the prism part at the outwardly curved areas of the prism part than at the inwardly curved areas of the prism part.

2. The shaping shoulder according to claim 1, wherein the shoulder part is comprised of several shoulder components arranged on both sides of the web.

3. The shaping shoulder according to claim 2, wherein some of the shoulder components are formed as a roller.

4. The shaping shoulder according to claim 1, wherein, for shaping a double tube from a single film web, in an area of the prism part (3) correlated with a web center of the web, the cross-section of the prism part (3) has a straight area (20) adjoining on both sides of the web center, wherein the outwardly curved areas are connected to the straight area.

5. The shaping shoulder according to claim 1, wherein, for shaping a parallel tube chain, the prism part (3) beginning at a web center of the web is partially inwardly curved and, after closing a cross-section of the web and forming a seam on the web, again curves outwardly.

6. A device for producing longitudinally shaped webs with a closed cross-section, the device comprising:

a shaping shoulder according to claim 1, removal members arranged underneath the shaping shoulder and configured to grip the shaped web in the form of a tube formed by the prism part at overlapping areas.

7. The device according to claim 6, wherein the removal members comprise one or several roller pairs or grippers.

8. The device according to claim 7, wherein, when several of the roller pairs are provided, the roller pairs can be operated with different speed.

9. The device according to claim 7, wherein, when several of the grippers are provided, the grippers are operated with different removal stroke.

10. The device according to claim 6, wherein the removal members are configured as welding members.

11. A shaping shoulder for producing a web shaped longitudinally relative to a transport direction of the web and having an open or closed cross-section and at least one area inside the web in which the cross-section is curved outwardly, the shaping shoulder comprising:

a shoulder part and a prism part joined to one another at a shaping edge;

wherein the shoulder part has a web inlet and extends from the web inlet to the shaping edge and wherein the prism part has an exit, where the web exits after shaping as a shaped web, arid extends from the shaping edge to the exit;

wherein the prism part has a longitudinal extension in the transport direction of the web along the prism part toward the exit and has a cross-section perpendicular to the longitudinal extension;

wherein the shaping edge is slanted in a direction toward the exit relative to a plane of the cross-section of the prism part;

wherein the cross-section of the prism part has inwardly curved areas and outwardly curved areas, wherein the outwardly curved areas are defined by an inner angle of the prism part that is greater than 180 degrees, located at least in the vicinity of a web edge, wherein the shaping edge is slanted less relative to the plane of the cross-section of the prism part at the outwardly curved areas of the prism part than at the inwardly curved areas of the prism part.

* * * * *